April 27, 1954     A. A. KOTTMANN     2,676,690
ARTICLE TRANSFER MECHANISM FOR FLIGHT CONVEYERS
Original Filed Oct. 6, 1950     3 Sheets-Sheet 1

INVENTOR
ARTHUR A. KOTTMANN
BY Evans + McCoy
ATTORNEYS

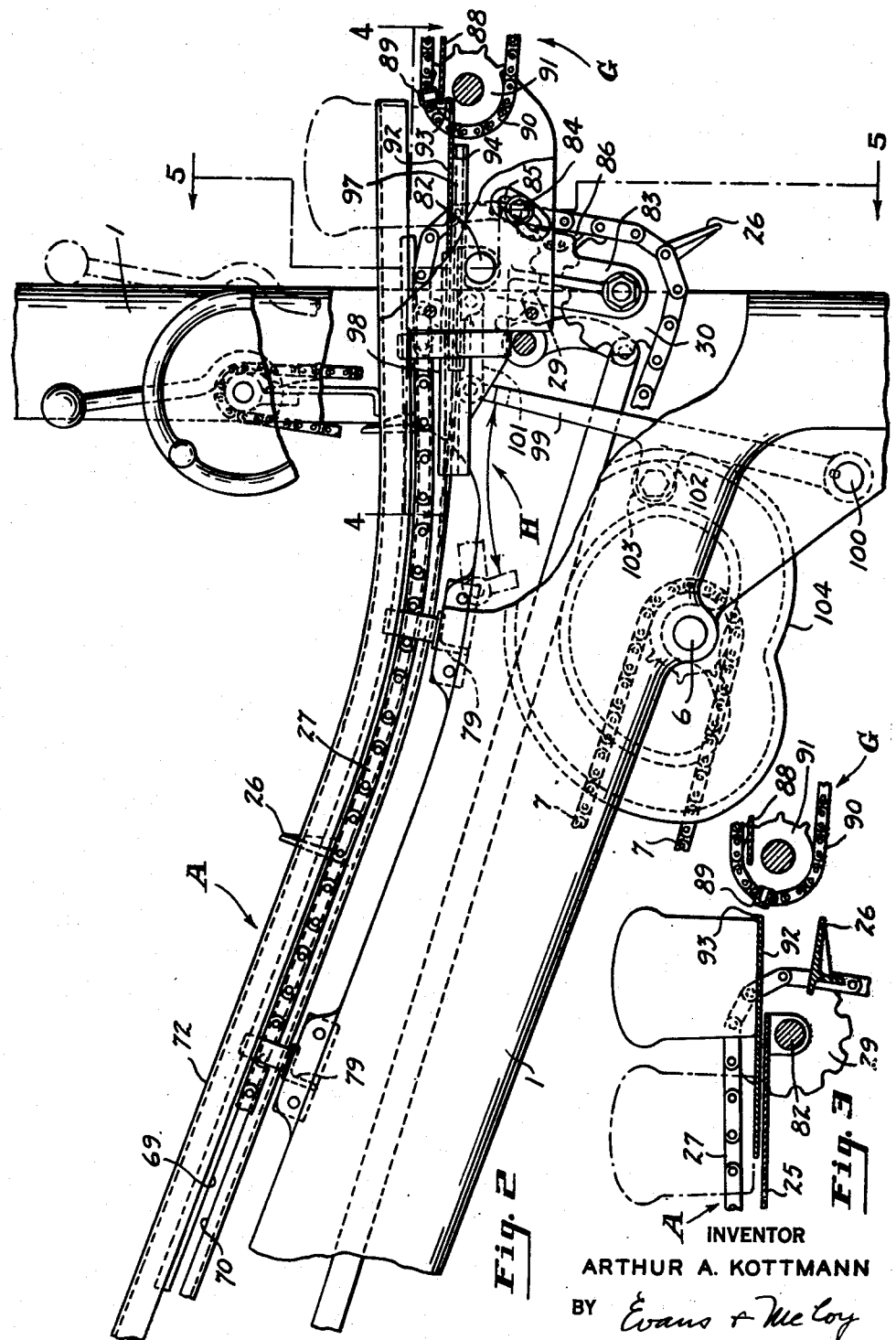

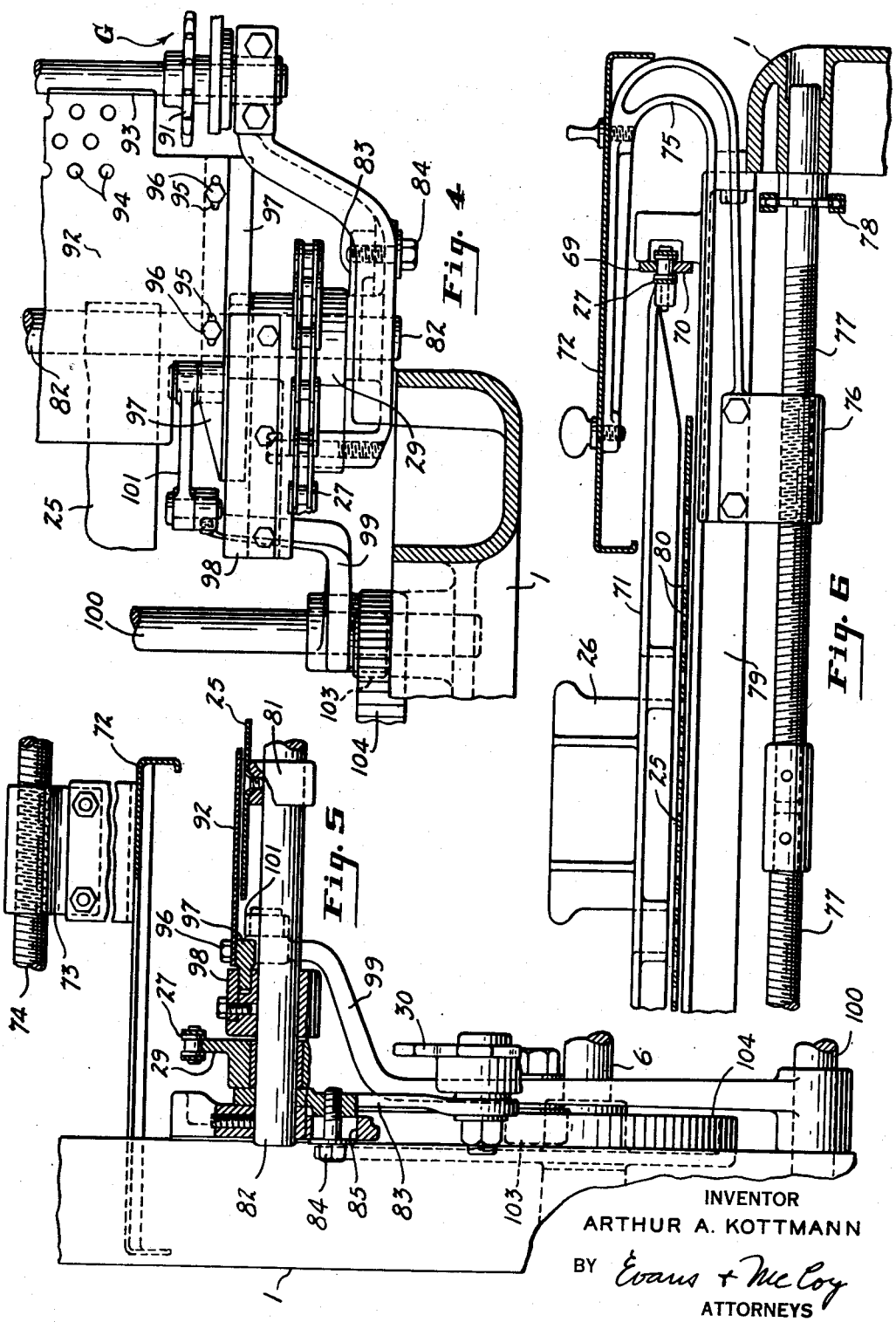

Patented Apr. 27, 1954

2,676,690

UNITED STATES PATENT OFFICE 2,676,690

ARTICLE TRANSFER MECHANISM FOR FLIGHT CONVEYERS

Arthur A. Kottmann, Davenport, Iowa, assignor, by mesne assignments, to American Machine & Foundry Company, New York, N. Y., a corporation of New Jersey Original application October 6, 1950, Serial No. 188,686. Divided and this application February 28, 1952, Serial No. 273,943

4 Claims. (Cl. 198—23)

This invention relates to mechanisms for transferring articles from one endless flight conveyor to another in longitudinal alinement therewith and particularly to a shuttle mechanism suitable for transferring sliced loaves of bread from the bed of a continuously driven endless flight discharge conveyor of a bread slicing machine to the bed of an intermittently driven endless flight feed conveyor of a bread wrapping machine, this application being a division of my copending application Serial No. 188,686, filed October 6, 1950.

The transfer device of the present invention is disposed between the beds of two flight conveyors that are arranged end to end, each of the conveyors having longitudinally spaced flights that are carried by laterally spaced endless chains and that push the articles along a supporting bed. Between the ends of the two conveyor beds it is necessary to provide a gap of sufficient width to permit the flights to move over the ends of the adjacent beds.

The transfer device is in the form of a reciprocating shuttle plate that moves from a position bridging the space between the conveyor beds in which its forward end is beneath the rear end of the bed of the slicer discharge conveyor where it is in position to receive a sliced loaf when it is pushed off the rear end of the bed of the slicer discharge conveyor, to a position closely overlying the bed of the wrapper feed conveyor and within the path of travel of the flights of said feed conveyor where the flights of the feed conveyor engage the sliced loaf and move it off the shuttle plate.

The invention has for its object to provide a transfer device by means of which articles such as sliced loaves of bread can be transferred without damage or disarrangement from the bed of one flight conveyor to the bed of another flight conveyor longitudinally alined therewith.

Reference should be had to the accompanying drawings forming a part of this specification in which:

Fig. 2 is a fragmentary side elevation of the receiving end of the wrapping machine feed conveyor and the delivery end of the slicing machine discharge conveyor, together with the article transfer mechanism interposed between the two conveyors;

Fig. 3 is a fragmentary longitudinal vertical section showing the shuttle plate in an intermediate position;

Fig. 4 is a fragmentary horizontal section taken on the line indicated at 4—4 in Fig. 2;

Fig. 5 is a fragmentary vertical section taken on the line indicated at 5—5 in Fig. 2; and Fig. 6 is a fragmentary transverse vertical section through a portion of the wrapper feed conveyor.

Figure 1:
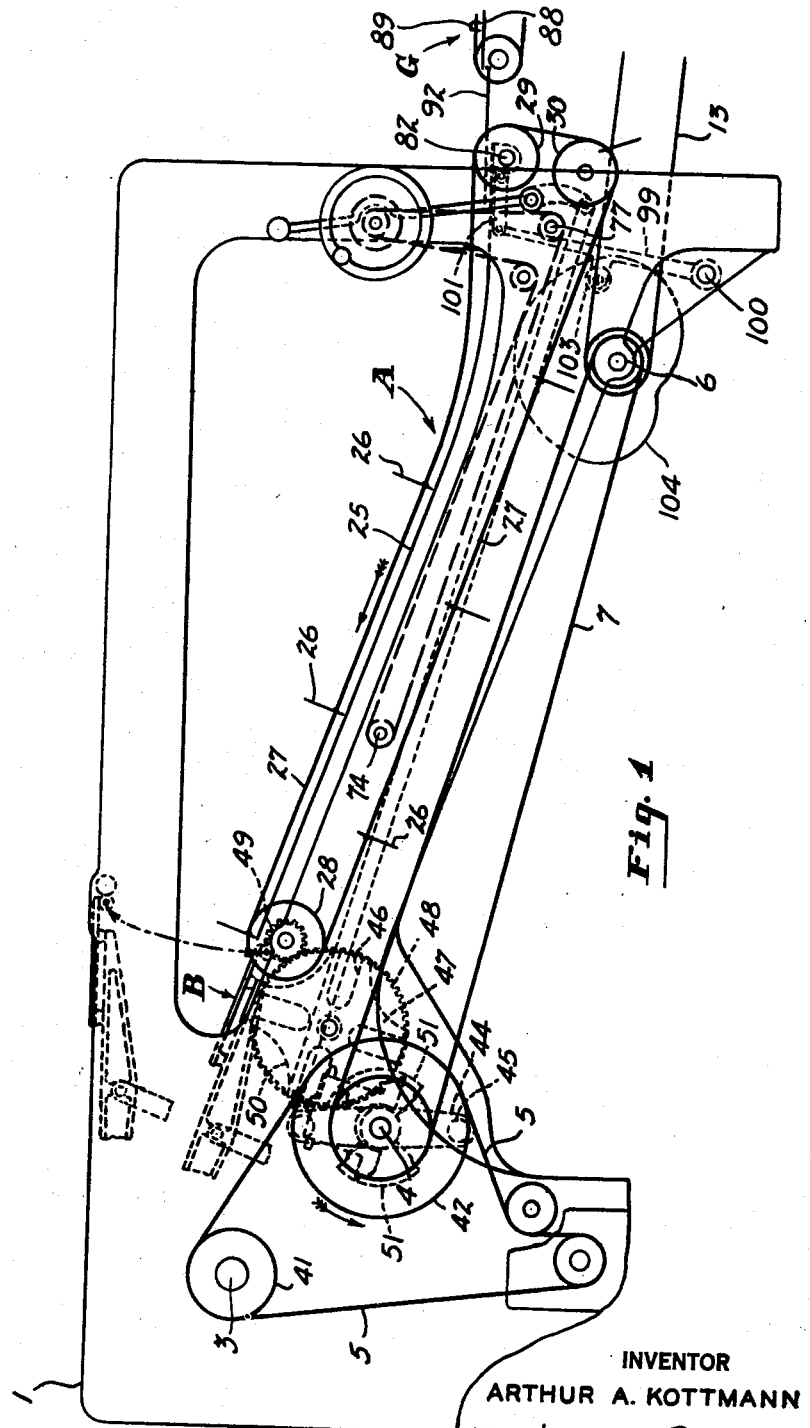
Figure 1 is a diagrammatic side elevation showing the article moving conveyors and the driving mechanism therefor.

In the accompanying drawings the invention is shown applied to the feed mechanism of a bread wrapping machine in which sliced loaves of bread are delivered one at a time from a continuously driven flight conveyor which may be the discharge conveyor of a bread slicing machine, to an intermittently driven flight conveyor which is the feed conveyor of a bread wrapping machine. As shown in Fig. 1, the wrapping machine has a frame I which provides support for an article feed conveyor A which receives articles to be wrapped from a conveyor G and which delivers the articles to the elevator B of the wrapping machine. A horizontal shaft 3 journaled in the rear end portion of the frame I is the wrapping mechanism drive shaft and a shaft 4 parallel with the shaft 3 is the conveyor drive shaft, the shafts 3 and 4 being driven by a sprocket chain 5. A sprocket chain 7 drives a shaft 6 journaled in the frame I adjacent its forward end and a sprocket chain 13 drives the conveyor G.

The feed conveyor A is provided with a transversely flat bed 25 over which the articles to be wrapped are pushed by flights 26 which are carried by endless sprocket chains 27 that run over pairs of sprockets 28 and 29 at the delivery and receiving ends of the bed 25. Pairs of sprockets 28 and 29 are preferably mounted in fixed positions and the chains 27 are tensioned by means of adjustable sprockets 30 below the sprockets 29 at the forward end of the frame.

The conveyor A is driven intermittently and the chains 27 are moved a distance corresponding to the space between successive flights 26 on each actuation, the driving mechanism being so adjusted that the conveyor stops with a flight 26 in substantially vertical position at the discharge end of the conveyor, in which position the article being pushed by the flight at the discharge end of the conveyor has been transferred from the bed 25 to the elevator B. The flight 26 at the discharge end of the conveyor remains stationary during the initial upward movement of the elevator so that it does not interfere with the movement of the article with the elevator.

The infeed conveyor A is intermittently driven from the shaft 4 through a Geneva type gearing which includes a drive wheel 44 fixed to the shaft 4 and having two driving pins in the form of rollers 45 which are diametrically opposite each other and at equal distances from the axis of the shaft 4. The rollers 45 engage in radial slots 46 in a Geneva gear 47 to which is attached a spur gear 48 which meshes with a gear 49 on the shaft of the sprockets 28. The gear 47 is provided with four radial slots 46 and is given a quarter turn upon each half revolution of the shaft 4. The gear 47 is provided with peripheral recesses 50 intermediate the slots 46 which are of arcuate contour to receive cylindrical locking segments 51 carried by the drive wheel 44 to lock the gear 47 against turning movements during intervals between actuations thereof by the pins 45.

The sprocket 42 on the shaft 4 is twice the diameter of the sprocket 41 on the shaft 3 so that the shaft 4 rotates at half the speed of the shaft 3. The shaft 3 rotates once during each cycle of operation of the machine and the shaft 4 makes a one-half revolution during each cycle of operation.

The gears 48 and 49 are so proportioned that a movement is imparted to the infeed conveyor A to move the flights a distance exactly equal to the length of the space between them upon each actuation of the conveyor, and the infeed conveyor has one movement during each wrapping cycle to deliver an article to the elevator B each time that the elevator is lowered to a position in alinement with the conveyor.

As shown in Fig. 2, the flight carrying chains 27 are guided along their upper run between upper and lower longitudinal bars 69 and 70 that are disposed parallel to the bed plate 25. In order to insure proper feed of articles to the wrapping mechanism, the pusher flights 26 are in the form of relatively high central portions of transverse bars 71 connected to the chains 27, and overlying the end portions of the bars 71 are flat top guide rails 72 which are mounted for adjustment laterally toward and away from the central flights 26.

The upper ends of the guide rails 72 are detachably secured to nuts 73 that are carried by a transverse screw shaft 74. The lower ends of the rails 72 are detachably secured to curved arms 75 that are attached to nuts 76 which are carried by a transverse screw shaft 77. The screw shafts 74 and 77 are journaled in the sides of the machine frame and each has a right and left-hand screw for simultaneously adjusting the guide rails toward and away from the center line of the conveyor.

The bed 25 of the conveyor A is supported at intervals by crossbars 79 and may be provided with openings 80 through which loose material such as crumbs may pass. The forward receiving end of the conveyor is substantially horizontal and the horizontal forward portion of the bed 25 terminates between the sprockets 29 where it is supported on blocks 81 on a cross shaft 82 upon which the sprockets 29 are mounted. The tightening sprockets 30 are carried by arms 83 connected to move together and pivoted to the shaft 82. The arms 83 are secured in adjusted positions to the frame 1 by bolts 84 which extend through arcuate slots 85. The arms 83 carry guide shoes 86 that engage with the conveyor chains to hold them straight between the sprockets 29 and 30.

The conveyor G is of the endless flight pusher type and has a bed 88 over which the sliced loaves are pushed by flights 89 extending transversely between endless sprocket chains 90. At the discharge end of the conveyor G the chains 90 run over sprockets 91 and the bed 88 extends into the space between the sprockets 91 substantially to the point where the flights 89 begin their downward movement. The sliced loaves are transferred one at a time from the continuously moving conveyor G to the intermittently driven infeed conveyor A by means of a shuttle plate 92 that is mounted for horizontal movement from a position in which its forward end is substantially beneath the bed 88, to a position in which it is entirely inside the path of travel of the flights 26 and overlies the bed 25 of the conveyor A. The plate 92 has a short flange 93 at its forward end which serves to prevent the plate from being pulled out from under the loaf or other article being transferred to the feed conveyor, and may be provided with spaced holes 94 through which crumbs may drop.

The shuttle plate 92 is somewhat wider than the forward end portion of the bed 25 and has longitudinal slots 95 at its side edges which receive bolts 96 which attach it to bars 97 that slide in horizontal guides 98 at the front and back that are attached to the shaft 82 and to the frame 1. By means of its bolt and slot connection to the bars 97, the plate 92 may be adjusted on the bars 97 to provide the desired forward dwell position of the plate 92 and to provide the desired clearance between the plate 92 and flights 89 during the article transferring operation. The shuttle plate 92 is reciprocated in timed relation to the operation of the conveyors A and G by means of actuating levers 99 attached at their lower ends to a horizontal cross shaft 100 journaled in the machine frame and connected at their upper ends to the forward ends of the bars 97 by means of links 101. One of the levers 99 has a rearwardly projecting arm 102 carrying a roller 103 that is received in the groove of an operating cam 104 that is attached to the shaft 6. The cam 104 is so formed that the shuttle plate 92 is moved forwardly to a position immediately adjacent the delivery end of the bed 88 of the conveyor G during the dwell of the conveyor A and just before the loaf or other article to be transferred reaches the end of the bed 88. When the loaf is completely transferred from the bed 88 to the plate 92 the shuttle plate begins its rearward movement at a speed sufficient to move out of the path of the adjacent flight 89. The plate 92 completes its transfer movement before the conveyor A moves sufficiently to bring a flight into engagement with the transferred loaf, and begins its return movement after the loaf has been pushed off the plate 92 onto the bed 25. The shaft 6 makes two revolutions during one revolution of the shaft 4 so that the movement of the shuttle plate 92 is timed with respect to the movement of the flights 26, and the conveyor G is driven at a speed such that the movement of its flights 89 is timed with respect to the movements of the shuttle plate, the flights 89 being advanced a distance corresponding to their spacing during each reciprocation of the shuttle plate.

In the forward position of the shuttle plate 92 the flange 93 underlies the bed plate 88 so that there is no gap between the bed and plate and delivery of the article onto the shuttle plate ahead of the flange 93 is insured. The initial speed of movement of the shuttle plate is such that the forward edge thereof is moved out of the path of the adjacent flight 89 before the flight 89 crosses the path of the shuttle plate so that there can be no pinching of the article between the flight and shuttle plate.

It is to be understood that in accordance with the provisions of the patent statutes, variations and modifications of the specific devices herein shown and described may be made without departing from the spirit of the invention.

What I claim is:

1. An article feed mechanism comprising a first endless flight conveyor having a bed underlying its upper run over which articles are pushed, a second endless flight conveyor alined with the first and having a bed underlying its upper run over which articles are pushed toward the first conveyor and spaced from the bed of said first conveyor, means for driving said conveyors in timed relation to advance the flights of one a distance corresponding to their spacing while the flights of the other are being advanced a distance corresponding to their spacing, a shuttle plate mounted to reciprocate from an article receiving position adjacent the delivery end of the second conveyor in which its forward edge underlies the rear end of the bed of said second conveyor to a position within the path of travel of the flights of the first conveyor in which it overlies the bed of the first conveyor, said plate having an upstanding flange at its forward edge that underlies the bed of the second conveyor when said plate is in article receiving position and that is engageable with an article thereon to retain the article on the plate during rearward movement of the plate, and means for reciprocating said shuttle plate in timed relation to the movements of said conveyors to receive articles engaged by the flights of the second conveyor and to move the articles rearwardly away from and out of the path of successive flights of said second conveyor and into the path of successive flights of the first conveyor.

2. An article mechanism comprising a first endless flight conveyor having a bed underlying its upper run over which articles are pushed, a second endless flight conveyor alined with the first and having a bed underlying its upper run over which articles are pushed toward the first conveyor and spaced from the bed of said first conveyor, means for intermittently driving the first conveyor with successive movements advancing the flights thereof a distance corresponding to their spacing and with a dwell between successive movements, means for driving the second conveyor continuously at a speed to advance its flights a distance corresponding to their spacing during one movement and dwell of the first conveyor, a shuttle plate mounted to reciprocate from an article receiving position adjacent the delivery end of the second conveyor in which its forward edge underlies the rear end of the bed of said second conveyor to a position within the path of travel of the flights of the first conveyor in which it overlies the bed of the first conveyor, said plate having an upstanding flange at its forward edge that underlies the bed of the second conveyor when said plate is in article receiving position and that is engageable with an article on the plate to retain the article on the plate during rearward movement of the plate, and means for reciprocating said shuttle plate in timed relation to the movements of said conveyors to receive articles engaged by the flights of the second conveyor and to move the articles rearwardly away from and out of the path of successive flights of said second conveyor and into the path of successive flights of the first conveyor.

3. An article feed mechanism comprising a first endless flight conveyor having a bed underlying its upper run over which articles are pushed, a second endless flight conveyor alined with the first and having a bed underlying its upper run over which articles are pushed toward the first conveyor, means for driving said conveyors in timed relation to advance the flights of one a distance corresponding to their spacing while the flights of the other are being advanced a distance corresponding to their spacing, a shuttle plate mounted to reciprocate from a position adjacent the delivery end of the second conveyor in which its forward edge underlies the rear end of the bed of said second conveyor to a position within the path of travel of the flights of the first conveyor in which its rear end overlies the bed of the first conveyor, means for reciprocating said shuttle plate in timed relation to the movement of said conveyors to move articles away from successive flights of the first conveyor and into the path of successive flights of the second conveyor, and means for adjusting the stroke of said shuttle plate to vary the extent of its movement toward said second conveyor.

4. An article feed mechanism comprising a first endless flight conveyor having a bed underlying its upper run over which articles are pushed, a second endless flight conveyor alined with the first and having a bed underlying its upper run over which articles are pushed toward the first conveyor, means for intermittently driving the first conveyor with successive movements advancing the flights thereof a distance corresponding to their spacing and with a dwell between successive movements, means for driving the second conveyor at a speed to advance its flights a distance corresponding to their spacing during one movement and dwell of the first conveyor, a shuttle plate mounted to reciprocate from a position adjacent the delivery end of the second conveyor in which its forward edge underlies the rear end of the bed of said second conveyor to a position within the path of travel of the flights of the first conveyor in which its rear end overlies the bed of the first conveyor, and means including a cam continuously driven in timed relation to said conveyor driving means for reciprocating said shuttle, said cam being formed to start the rearward movement of said shuttle plate substantially simultaneously with the movement of the article engaging flight over the rearward end of the bed of said second conveyor and at a speed sufficient to keep said plate and the article thereon clear of the said flight during its movement downwardly past the rear end of said bed.

References Cited in the file of this patent

UNITED STATES PATENTS

| Number | Name | Date |
|---|---|---|
| 1,226,932 | White | May 22, 1917 |
| 1,566,717 | Wolf | Dec. 22, 1925 |
| 1,858,619 | Delamere | May 17, 1932 |
| 2,179,798 | Petskeyes | Nov. 14, 1939 |